United States Patent
Carr

[15] 3,692,045
[45] Sept. 19, 1972

[54] CONTROL MECHANISM FOR IRRIGATION SYSTEM

[72] Inventor: James P. Carr, East Lansing, Mich.
[73] Assignee: FMC Corporation, San Jose, Calif.
[22] Filed: Aug. 31, 1970
[21] Appl. No.: 68,295

[52] U.S. Cl. ................................................137/344
[51] Int. Cl. ........................B05b 9/02, E01h 3/02
[58] Field of Search......239/212, 213, 181, 190, 241, 239/242, 243; 137/344

[56] References Cited

UNITED STATES PATENTS

| | | | |
|---|---|---|---|
| 3,386,661 | 6/1968 | Olson et al. | 239/212 X |
| 3,500,856 | 3/1970 | Boone et al. | 137/344 |
| 2,800,364 | 7/1957 | Dick et al. | 239/212 X |
| 3,394,729 | 7/1968 | Bower et al. | 239/212 X |
| 3,417,766 | 12/1968 | Purtell | 239/212 X |
| 3,465,766 | 9/1969 | Siebert | 239/212 X |
| 3,498,542 | 3/1970 | Hefner et al. | 239/212 |
| 3,558,257 | 1/1971 | Harris | 239/212 |
| 3,558,258 | 1/1971 | Johnson, Jr. | 239/212 |

*Primary Examiner*—Samuel Scott
*Attorney*—F. W. Anderson, C. E. Trippl and J. F. Verhoeven

[57] ABSTRACT

An irrigation system has a series of spaced carriages to support a water pipe for lateral movement. There is for each carriage motor valve a pivotal control member mounted on a support member and connected at one end to the water pipe. The control member has two alternative fulcrums straddling the valve so that the control member, selectively, will operate the valve in one direction or the other, depending on the fulcrum in use, when the pipe bends in a given direction because the particular carriage is leading or lagging other carriages. The connection of the control member to the pipe can be adjusted so that, if the water pipe is to move around a central pivot point, the motors for the outer carriages will normally run faster than the motors for the inner carriages.

12 Claims, 9 Drawing Figures

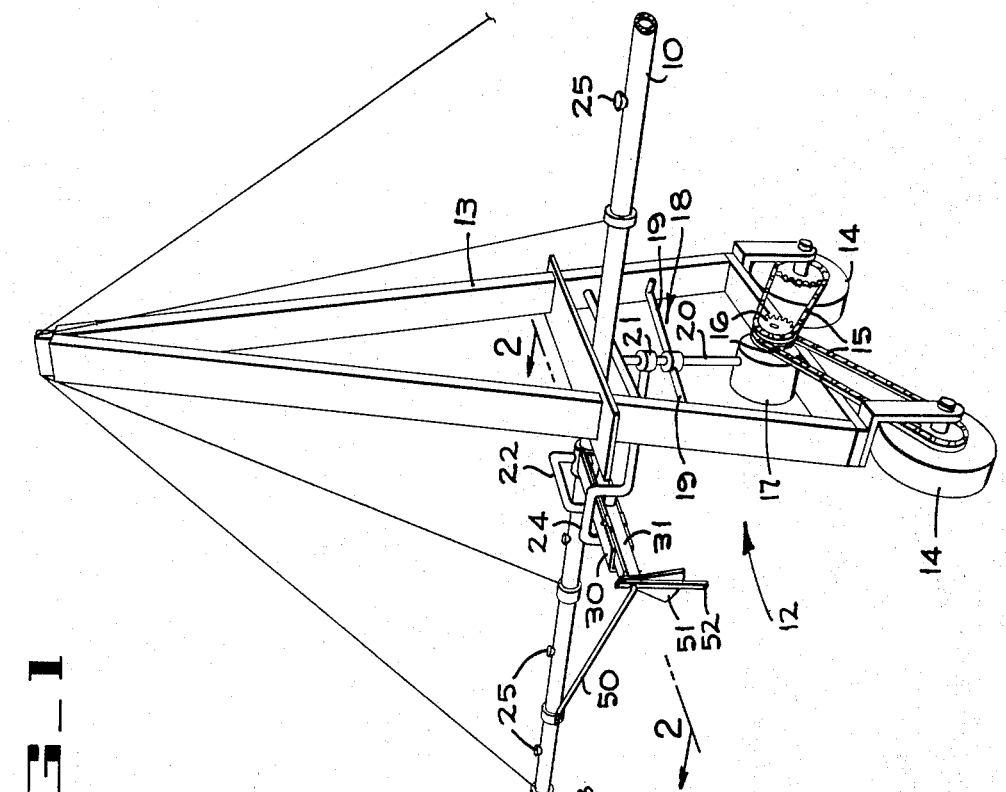
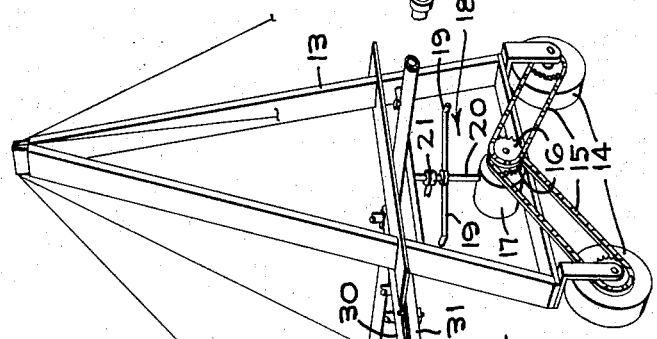
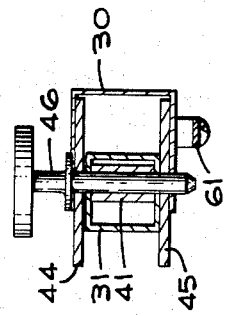
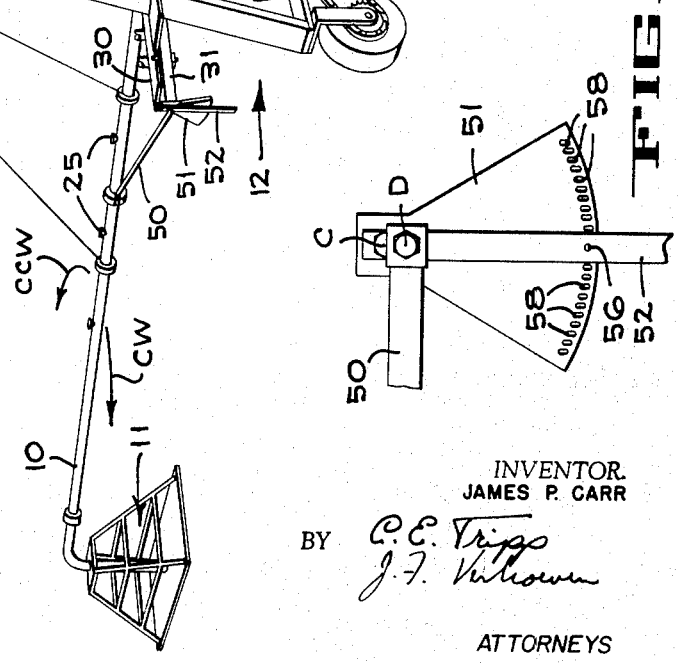
INVENTOR.
JAMES P. CARR
BY C.E. Tripp
J.F. Vichauer
ATTORNEYS

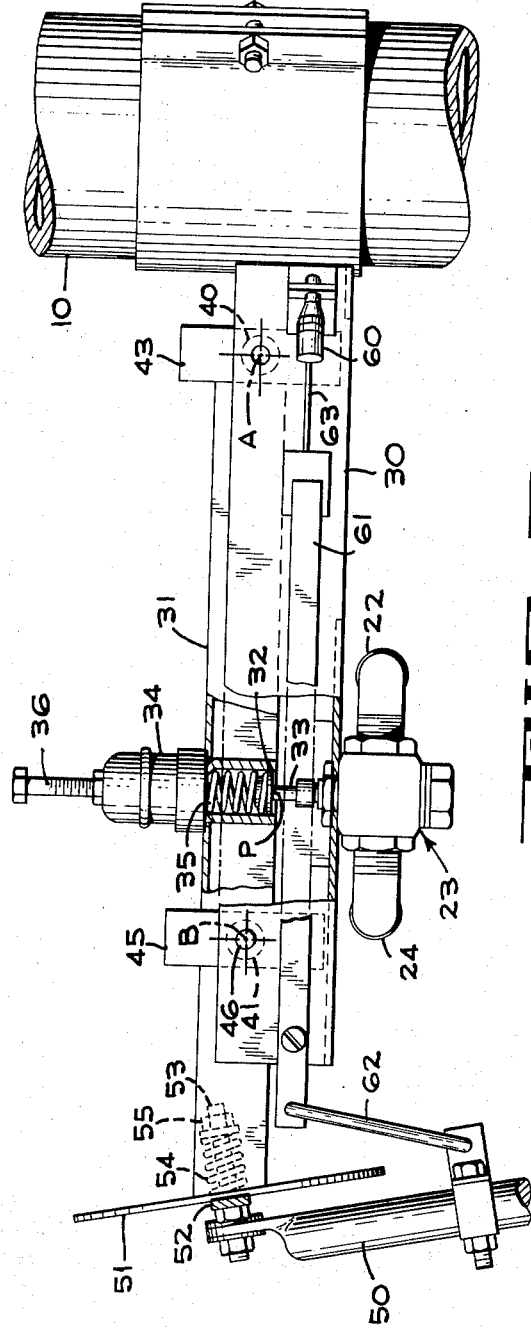
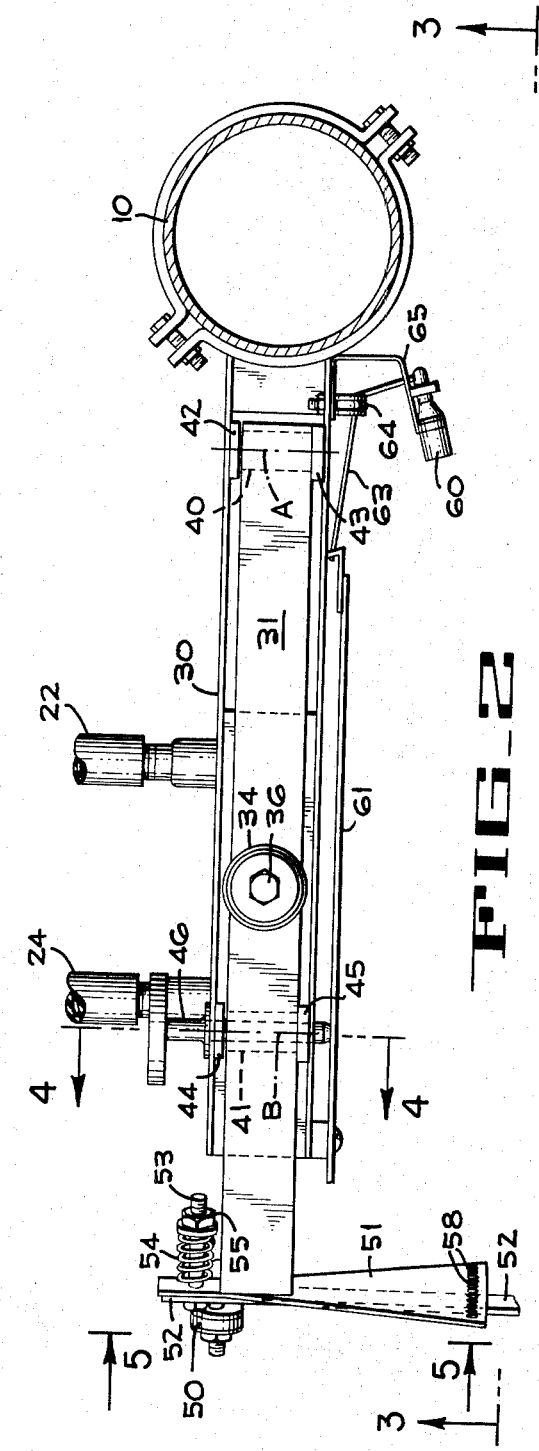

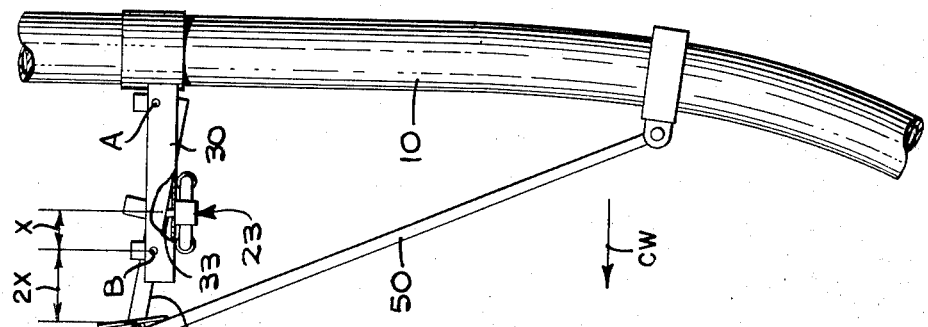
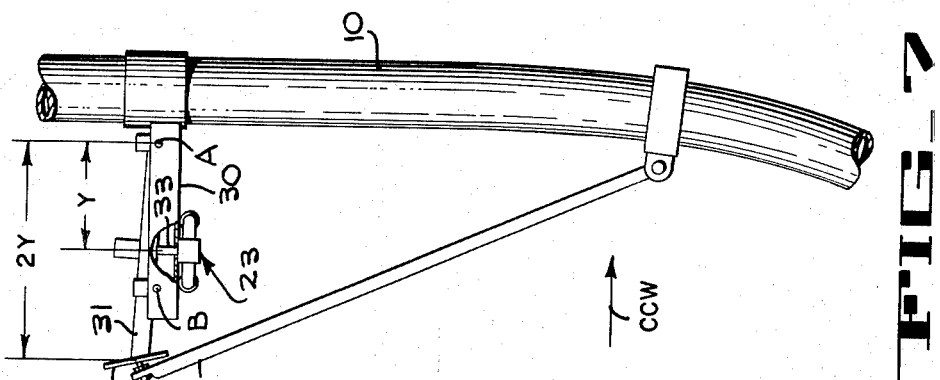
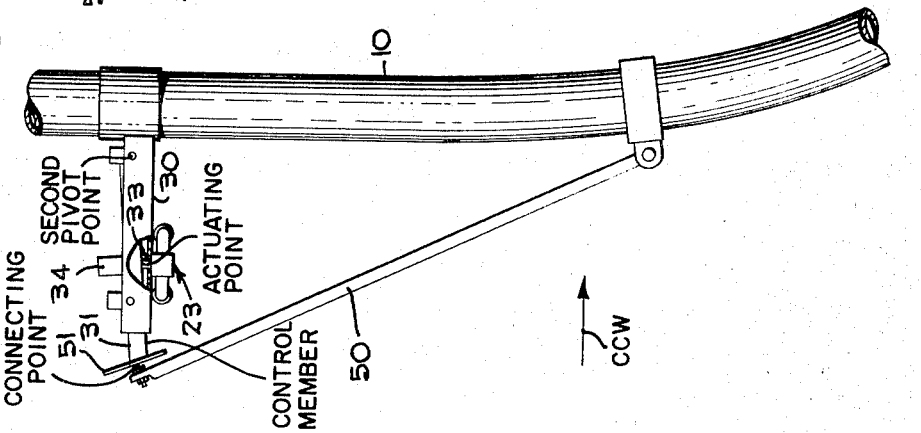

CONTROL MECHANISM FOR IRRIGATION SYSTEM

BACKGROUND OF THE INVENTION

1. Field of the Invention

One form of irrigation system consists of a long water pipe which is connected at one end to a source of water. The water pipe has spaced sprinkler heads which sprinkle water on the ground as the pipe moves over a field. A plurality of spaced carriages support the pipe above the ground for movement across the field. Usually, the pipe is pivotally connected to a central water source, and the carriages move the pipe, which extends radially from the central source, through 360°. It is important that the pipe remain reasonably straight, to prevent rupture thereof, and this is accomplished by regulating the speed of each carriage motor.

2. Description of the Prior Art

In the usual irrigation system of the type in which an elongated pipe is moved across a field, the motor of each carriage is controlled by a valve which is operated automatically in response to the position of the carriage relative to the other carriages. If a carriage lags behind adjacent carriages, the valve which controls the motor of that carriage automatically speeds up the motor; if a carriage moves ahead of adjacent carriages the carriage motor valve automatically slows down the motor.

One of the problems of controlling an irrigation pipe to keep it straight stems from the reversal of direction of travel of the pipe. It will be noted that if the pipe is moving, say, North, the southernmost carriage will be speeded up by the control system to keep the pipe line straight. Similarly, if the pipe is pivoting clockwise around a central source of water, the most counterclockwise carriage will be speeded up to keep the line straight. However, if the line is moving South, or the line is pivoting counterclockwise, the southernmost carriage, or the most counterclockwise carriage, will have to be slowed down to keep the pipe line straight. Thus, the controls must operate reversely when the carriages are driven reversely.

In the copending United States patent application of Haynes U.S. Ser. No. 757,238, which issued as Patent No. 3,590,853 on July 6, 1971 and is assigned to the same assignee as the present invention, the carriages of an irrigation system are driven by a drive shaft. When the direction of rotation of the drive shaft is reversed, the operation of the controls is reversed so that a straight line of pipe can be maintained in either direction of travel of the pipe.

SUMMARY OF THE INVENTION

In the present invention, control mechanism for an irrigation pipe line is provided which can easily be adjusted to operate reversely so that the irrigation pipe line can be maintained straight regardless of the direction of travel of line. The control system does not rely on a rotating drive shaft, and can be utilized in a system in which each pipe supporting carriage is driven by its own carriage motor. In brief, a control member, or lever, is mounted on a support which may, for example, be secured to the water pipe adjacent the carriage, the speed of which is to be controlled by the control member. The lever is mounted adjacent the valve which controls the speed of the carriage motor. There are two alternative fulcrum points on the lever, one on each side of the valve, which can be selectively changed by the operator by moving a fulcrum pin. The outer end of the control lever is connected to the water pipe by means including a rod so that the lever is swung about a fulcrum point when the pipe bends. The pipe, when moving across the field in a given direction, will bend in one direction if the carriage leads adjacent carriages and will bend in the opposite direction if the carriage lags adjacent carriages. For one direction of movement of the pipe line, the control lever fulcrum will be on one side of the valve to operate the actuating member of the valve in a given manner. When the pipe is moving across the field in the opposite direction of movement of the pipe line, the control lever fulcrum will be on the opposite side of the valve to operate the actuating member of the valve in the opposite manner.

In systems where the pipe line turns about a central pivot point, it is necessary that the outer carriages move more rapidly than the inner carriages. The connection between the control lever and the pipe can be selectively modified at each carriage so that when the carriages are properly aligned the actuating stems of the valves which control the motors of the outer carriages are more fully depressed to run these motors faster than the motors for the inner carriages.

It is therefore one object of the present invention to provide a control system for a reversible irrigation line.

It is another object of the present invention to provide a system to control the speed of each carriage motor, regardless of the direction of rotation, in an irrigation system where each pipe supporting carriage is driven by an independent motor.

It is another object of the present invention to provide a control system in which the optimum speed of each motor can be adjusted independently.

BRIEF DESCRIPTION OF THE DRAWINGS

FIG. 1 is a fragmentary view in perspective showing two carriages of the irrigation system and showing the central source of water for the system.

FIG. 2 is a view taken on the line 2—2 of FIG. 1.

FIG. 3 is a view taken on the line 3—3 of FIG. 2.

FIG. 4 is a view taken on the line 4—4 of FIG. 2.

FIG. 5 is a view taken on the lines 5—5 of FIG. 2.

FIG. 6 is a schematic bottom plan view of the control mechanism, taken as the view of FIG. 3, operating the valve to speed up a lagging carriage moving to the right as viewed in FIG. 6.

FIG. 7 is a schematic bottom plan view of the control mechanism, taken as the view of FIG. 3, operating the valve to slow down a leading carriage moving to the right as viewed in FIG. 7.

FIG. 8 is a schematic bottom plan view of the control mechanism, taken as the view of FIG. 3, operating the valve to slow down a leading carriage moving to the left as viewed in FIG. 8.

FIG. 9 is a schematic bottom plan view of the control mechanism, taken as the view of FIG. 3, operating the valve to speed up a lagging carriage moving to the left as viewed in FIG. 9.

DESCRIPTION OF THE PREFERRED EMBODIMENT

The irrigation system shown in FIG. 1 has a water pipe 10 which is connected to a source 11 of water. The pipe 10 is supported by many spaced carriages 12 each of which has an A-frame 13. The A-frame has tandem wheels 14 which are driven by chains 15. The chains 15 are connected by sprockets 16 to the output shaft of a speed reducer 17. The speed reducer 17 is driven by a reaction water motor 18 having radially extending diametric arms 19. The arms, which are tubular, are connected to a tubular shaft 20, constituting the output shaft of the motor, which is journaled in a joint 21. Water from water pipe 10 passes through a line 22 to a valve 23 (see FIG. 3), through the valve to line 24, through line 24 to the joint 21, through joint 21 to the motor 18, and out the ends of arms 19, which are bent at the outer ends. The discharging water, which falls to the ground, rotates the output shaft 20. The shaft 20 is connected to the speed reducer to drive that unit. Sprinklers 25 are connected to water pipe 10 between the spaced carriages to supplement the irrigation effected by discharge of the water from the reaction water motors. The above described source, water pipe, carriages, water motor, gear reducer, and chain drive are similar to the corresponding elements shown in the United States patent to Curtis U.S. Pat. No. 3,314,608.

Valve 23 is mounted on the closed back of a support member 30 which is secured at its inner end to the water pipe 10 adjacent a carriage 12. Support member 30 is a C-shaped member having an open side opposite the valve, as shown in FIG. 4. A control member, or lever, 31 which is of square, tubular cross section, is pivotally mounted in the support member, extending partially out the open side thereof. The lever has an abutment surface 32 (FIG. 3) which engages the operating plunger, or actuating member, 33 of valve 23 at an actuating point P to control the amount of water passing through valve 23. In normal operation, the surface 32 defines a fixed, unyielding surface on the lever 31. The abutment surface, however, is mounted in a housing 34 and is yieldable against the pressure of spring 35 to prevent damage to the valve if the lever 31 at the valve should move toward the valve after the operating plunger has bottomed in the valve. An adjusting screw 36, by moving the outer end of the spring toward or away from the valve, permits adjustment of the compression in spring 35.

An inner bushing 40 is mounted on axis A through the inner end of lever 31 and a similar outer bushing 41 is mounted on axis B through the outer end of lever 31. Inner pads 42, 43 are mounted on the inner sides of the top and bottom surfaces of support member 30, to straddle lever 31, in alignment with inner bushing 40. Similarly outer pads 44, 45 are mounted on the inner sides of the top and bottom surfaces of support member 30 to straddle lever 31 in alignment with outer bushing 41. A single fulcrum pin 46 is selectively placed through either the inner pads and bushing on axis A or through the outer pads and bushing on axis B. When pin 46 is placed through the inner bushing, the lever 31 is pivotal relative to the support member 30 about the fulcrum defined by axis A. When pin 46 is placed through the outer bushing, the lever 31 is pivoted relative to the support member 30 about the fulcrum defined by axis B.

The valve plunger 33, which is spring-urged against abutment plate 32, is actuated by the pivotal movement of lever 31. The pivotal movement of lever 31 is effected through a control rod 50, the inner end of which is secured to the main water pipe 10 spaced from the connection of the support member 30 to the pipe 10. The outer end of the control rod 50 is connected to the outer end of the lever 31 so that the control rod and lever form a triangle with the water pipe 10. When the water pipe bends by virtue of the fact that a carriage is leading or lagging adjacent carriages, the lever on the support member adjacent the leading or lagging carriage is swung in one direction or the other to either depress or release the valve plunger, depending on whether the lever fulcrum, or pin, is on axis A or axis B.

The connection of the control rod 50 to the outer end of the lever 31 is adjustable to permit adjustment of depression of the valve plunger for any given angular position of the lever. For this purpose plate 51, somewhat triangular in outline, is secured to the outer end of the tubular lever 31. A handle 52 is pivotally mounted to the upper end of the plate on axis C. The handle is connected to the plate by means of a bolt 53 having a spring 54 sandwiched between the plate and the securing nut 55 on the bolt. This flexible connection defined by the spring permits the lower end of the handle to be pulled away from the plate so that a detent pin 56 on the handle can be selectively inserted in any of an arc of holes 58 in the plate to hold the handle in the selected angular position. The handle 52 is pivotally connected on axis D to the outer end of the control rod 50. The angular adjustment of handle 52 will shift outer end of the lever to the left or right (as viewed in FIG. 5) with respect to control rod 50 and the support member 30 (both of which are secured to the water pipe), thereby either depressing or releasing the valve control plunger to affect the speed of the carriage motor for any given position of tee carriage relative to adjacent carriages.

When the irrigation pipe 10 is moving in a relatively straight line in a given direction about its pivot point of source 11, with each carriage aligned with adjacent carriages and with each carriage moving at a normal, desired optimum speed, each carriage will be moving over the ground at a different rate since each is spaced a different distance from the pivot point. Thus, each control handle 52 will be set at a different angular position on plate 51 to produce the desired optimum speed for that carriage. When the line is moving around the pivot point clockwise, all the handles will be set on one side of the plate 51, with the handles for the faster outer carriages more distant from the center of the plate than the handles for the inner slower carriages. When the line is reversed to move around the pivot point counterclockwise, all the handles will be switched to corresponding opposite positions on the other side of the plate 51.

To understand the operation of the control apparatus disclosed herein, assume initially that the water pipe 10 is to be driven counterclockwise about the central source 11. In FIGS. 6, 7, 8 and 9, the water pipe is viewed from underneath, with the pivot point (source 11) at the bottom of the sheet, so that FIGS. 6 and 7 represent counterclockwise movement of the pipe about source 11 (with the control rod 50 lagging the water pipe as shown in FIG. 1) while FIGS. 8 and 9 represent clockwise movement of the water pipe (with the control rod 50 leading the water pipe as shown in FIG. 1). The motor of the outer carriage (not shown) is set to operate at a fixed speed to act as a pacer for the system. The valves of the motors for the inner carriages are set, by angular adjustment of handles 52, to drive the carriages progressively slower as they are positioned inwardly from the outer carriage so that the innermost carriage of the system will be moving at the slowest speed. When finally adjusted, each carriage will move at the same angular speed about source 11 (say, for example, one revolution per 48 hours).

To cause the control system to be effective when the pipe 10 moves counterclockwise, all the fulcrum pins 46 are inserted in the inner bushings, as shown in FIG. 6, so that the levers 30 will pivot about axis A.

In order to drive the reaction water motors in the desired direction, the bent ends are turned, as described in the patent U.S. Pat. No. 3,314,608, to drive the arms in the appropriate direction. Alternatively, each motor map be supplied with two sets of arms, one set having the outer ends bent in a direction opposite to the direction in which the outer ends of the other set of arms are bent. Valves would be provided in the arms to selectively supply water to one or the other set of arms, depending on which direction the motor was to rotate to drive the carriage in the desired direction.

With all of the handles set, and with the motors set to turn in the appropriate direction, the radial water pipe will begin to swing counterclockwise about the source 11. If one carriage beings to lag, as the carriage adjacent the control mechanism shown in FIG. 6, the pipe 10 will bend to pull the control rod 50 so that the control lever 31 will be pulled against the valve actuating member, or plunger, to accelerate the motor. This will bring the lagging carriage up into line with the other carriages. If a carriage begins to lead the other carriages, as, for example, the carriage adjacent the control mechanism shown in FIG. 7, the outer end of the lever will be pushed away from the valve actuating member to slow down the motor, bringing the carriage back into line with the other carriages.

To reverse the direction of travel of the irrigation line about source 11, each water motor is reversed by turning the bent ends of the arms 180°. If two sets of arms are provided, the direction of rotation of the motors is reversed by operating the valves which switch the water flow from one set of arms to the other. The fulcrum pin is changed from the inner bushings to the outer bushings, as shown in FIGS. 8 and 9, so that the lever will pivot about axis B.

With these simple adjustments, the irrigation pipe 10 will swing clockwise about the source 11. If one carriage begins to lead adjacent carriages, as for example, the carriage adjacent the control mechanism shown in FIG. 8, the lever 31 will be pulled at the outer end to move the actuating point P of the lever (on abutment surface 32) away from the valve to slow down the motor, bringing the carriage back into line. If the carriage lags, as the carriage adjacent the control mechanism in FIG. 9, the outer end of the lever will be pushed to depress the valve plunger and speed the motor up, bringing the carriage back into line with adjacent carriages.

It will be noted that the provision of selective fulcrums for the levers permits reversal of operation of the valve, depending on the direction of travel of the line. It should also be noted that the relationship between the distance Y from fulcrum axis A to the actuating point P on the lever to the total distance 2Y from fulcrum axis A to the end of the lever connected to the control rod is the same as the relationship between the distance X from fulcrum axis B to actuating point P to the distance 2X from the fulcrum axis B to the end of the lever connected to the control rod. In other words, $Y/2Y = X/2X$. The quality of this relationship assures that the valves which actuate the motors will respond similarly to the bending of the pipe, regardless of the direction of travel of the irrigation line. In other words, a given flexure of pipe 10 will produce a constant depression of valve actuating member 33 when the irrigation line is moving in either direction.

A safety mercury switch 60, as shown in FIGS. 2 and 3, is mounted on each support member 30. An arm 61 is pivotally connected to the support member 30 and has the outer end connected by link 62 to the control rod 50. The inner end of the arm 61 is connected to one end of a chain 63 which passes through an eyelet 64. The other end of chain 63 is connected to the flexible bracket 65 by which switch 60 is mounted on member 30. If the pipe should bend excessively at any carriage, the arm 61 would be swung far enough to flex the bracket 65 to operate the switch 60. The switch 60, when operated, serves to terminate the flow of water to pipe 10, as for example, by shutting down the pump supplying water to the system or by operating a valve to stop the flow of water to line 10.

It is significant that the switch actuating arm 61, although operated by the rod 50, is independent of the movement of the control lever 31. The importance of this is that the position of each control lever 31 can be adjusted by the adjustment of control handle 52, and each control lever is generally set at a different angular position which is determined by the distance of the carriage being controlled from the pivot end of the pipe 10. Moreover, the movement of each lever 31 is changed, by changing the fulcrum pin thereof, on each reversal of direction of the irrigation line. If the safety switch were operated in response to movement of lever 31 to a particular position, each lever would have to move a different amount to reach that position, depending on the original setting of the lever by control handle 52. To avoid this undesirable condition, the operation of the safety switch has been isolated from the operation of the valve which controls the motor. It will be noted that switch-actuating arm 61 is connected to rod 50, which also operates lever 31, on the pipe side of the connection through plate 51 of the rod 50 to lever 31 so that the movement of arm 61 in response to bending of pipe 10 is unaffected ky the setting of control handle 52.

In some instances, an electric motor may be utilized to run the carriages instead of the water motors of the preferred embodiment described above. When electric motors are used, a rheostat, or switch, may be used to control the speed of the motor, the rheostat or switch thereby defining electric valves controlling the flow of current to the motor in the same manner as the water valve controls the flow of water to the water motor.

Although the best mode contemplated for carrying out the present invention has been herein shown and described, it will be apparent that modification and variation may be made without departing from what is regarded to be the subject matter of the invention.

What is claimed is:

1. In an irrigation system having a water pipe and having a plurality of carriages to transport said pipe across a field in either of two directions, said carriages each having a reversible motor to selectively drive the carriage in either of said two directions, mechanism for controlling said motors comprising motor speed adjusting means having an actuating member, a control member for engagement with said actuating member having a point on the control member, means defining a pair of parallel fulcrums for said control member spaced from said actuating member and disposed on opposite sides of said point, movable pivot means associated with said fulcrums, means to pivot said control member about one of said fulcrums and said pivot means in response to bending of the pipe, said pivot means being movable from one fulcrum to the other to permit reversing the relative position of said control member point and said fulcrums relative to the pipe to reverse movement of the valve actuating member in response to bending of the pipe for accommodating controllable movement of the carriage in either direction.

2. The apparatus of claim 1 including means to effect relative shifting between said control member and said actuating member operatively connected to said control member and independent of the bending of the pipe to adjust the motor to an optimum speed.

3. In an irrigation system having a plurality of carriages with motors to transport said pipe across a field in either of two directions, mechanism to control the speed of each of said motors to maintain the pipe in alignment; each mechanism comprising a valve having an actuating member, said actuating member movable to control the speed of a carriage motor, a control member for engagement with said actuating member at a point on the control member, means defining a first alternate fulcrum spaced from said actuating member on one side of said control member point, means defining a second alternate fulcrum parallel to the first fulcrum on the opposite side of said control member point, and means to pivot said control member selectively about one or the other of said fulcrums to shift said actuating member in one direction in response to misalignment of the pipe in one direction when the pipe is being driven in a first direction or to shift said actuating member in the same direction in response to misalignment of the pipe in the opposite direction when the pipe is being driven in the opposite direction for thereby accommodating controllable movement of a carriage in either direction.

4. In an irrigation system having a water pipe and having a plurality of carriages to transport said pipe across a field in either of two directions, said carriages each having a reversible motor to selectively drive the carriage in either of said two directions, mechanism for controlling the motor of a carriage comprising a support member connected to and extending from the pipe, a valve mounted on said support member and having an actuating member, said actuating member movable to control the speed of said motor, a control member for engagement with said actuating member at a point, parallel fulcrum defining means on said support member for said control member and spaced from said actuating member, a rod connected between said pipe and said control member to pivot said control member about said fulcrum in response to bending of the pipe in one direction, and means to permit reversing the relative position of said control member point and said fulcrum to reverse movement of the valve actuating member in response to bending of the pipe in said one direction for accommodating controllable movement of the carriage in either direction.

5. In an irrigation system having a water pipe supported on a plurality of carriages for movement across a field in either of two directions, each carriage having a water motor, the combination comprising a valve for each carriage to control the speed of the motor thereof, each valve having a movable actuating member, a control member to operatively engage said actuating member at an actuating point, a motion transmitting member connected between the water pipe and a connecting point on said control member to move the control member in response to bending of the pipe, means defining first and second parallel alternative pivot points for said control member spaced from said actuating member, said pivot points straddling said actuating point, said pipe when bent in one direction being effective to cause said control member to move said movable actuating member in one direction when said control member pivots about said first pivot point, and to cause said actuating member to move in the opposite direction when said control member pivots about said second pivot point for accommodating controllable movement of the carriage in either direction.

6. The apparatus of claim 5 in which the connecting point, actuating point, and first and second pivot points are positioned along the control member and are spaced to render the displacement of the valve actuating member and same when the first pivot point is used and the pipe is bent a given amount in one direction or the second pivot point is used and the pipe is bent the same amount in the opposite direction.

7. The apparatus of claim 5 in which the ratio of the distance between the first pivot point and the actuating point to the distance between the first pivot point and the connecting point is the same as the ratio of the distance between the second pivot point and the actuating point to the distance between the second pivot point and the connecting point.

8. In an irrigation system having a water pipe and having a plurality of carriages to support the water pipe and move said pipe across a field in either of two directions, said carriages each having a motor, and a source of water under pressure connected to one end of said water pipe, the combination for each of said carriages comprising a support, a valve to control the speed of said motor mounted on said support, an actuating member for the valve to regulate the speed of the carriage motor on movement of the actuating member, a control member pivotally mounted on the support to engage the actuating member for movement thereof, first means to pivot the control member in response to bending of the pipe, and second means to pivot the control member independently of bending of the pipe, said second means of each of said carriages being adjusted to progressively increase the speed of said carriage motors with the slowest speed being adjacent the water source and with the fastest speed being furthest from the water source.

9. The apparatus of claim 8 in which the second means to pivot the control member independently of bending the pipe includes a handle connected to said control member, and means for locking said handle in any one of a plurality of adjusted positions.

10. In an irrigation system having a water pipe and having a plurality of carriages to support the water pipe and move said pipe across a field, said carriages each having a motor, the combination comprising a support, a valve to control the speed of said motor mounted on said support, an actuating member for the valve to regulate the speed of the carriage motor on movement of the actuating member, a control member pivotally mounted on the support to engage the actuating member for movement thereof, means to pivot the control member in response to bending of the pipe, and means to pivot the control member independently of bending of the pipe, said means to pivot the control member independently of bending the pipe including a handle connected to said control member, said means to pivot the control member independently of bending the pipe includes a detent to hold the handle when the control member is in a desired predetermined position relative to the valve.

11. In an irrigation system having a water pipe, a plurality of carriages to support the pipe and move the pipe across a field, each carriage having a motor, a combination comprising an elongated support adjacent each of said carriages extending from the pipe, a valve for controlling the speed of a carriage motor mounted on the support, a control arm pivotally mounted on the support, a plate mounted on the end of the control arm, a handle pivotally connected to the plate, a control rod having one end connected to the pipe and the opposite end connected to the handle in spaced relation to the point at which the handle is connected to the plate, and means for locking said handle to said plate in any one of a plurality of adjusted positions.

12. In an irrigation system having a water pipe, a plurality of carriages to support the pipe and move the pipe across the field, each carriage having a motor, the combination comprising an elongated support adjacent each of said carriages extending from the pipe, a valve for controlling the speed of a carriage motor mounted on the support, a control arm pivotally mounted on the support, a plate mounted on the end of the control arm, a handle pivotally connected to the plate, a control rod having one end connected to the pipe and the opposite end connected to the handle in spaced relation to the point at which the handle is connected to the plate, and a detent to engage the plate to hold the control member in a desired predetermined position for aligned travel of the carriage controlled thereby.

* * * * *